United States Patent [19]

McMahan

[11] 4,380,077
[45] Apr. 12, 1983

[54] SEGMENTED CERAMIC BORE LASER

[75] Inventor: William H. McMahan, Salt Lake City, Utah

[73] Assignee: American Laser Corporation, Salt Lake City, Utah

[21] Appl. No.: 232,543

[22] Filed: Feb. 9, 1981

[51] Int. Cl.³ .............................................. H01S 3/03
[52] U.S. Cl. .................................... 372/62; 372/63; 372/61
[58] Field of Search ................................... 372/61, 62

[56] References Cited

U.S. PATENT DOCUMENTS 3,670,262  6/1982  Hallock et al. ...................... 372/62

Primary Examiner—William L. Sikes
Assistant Examiner—C. J. Britton
Attorney, Agent, or Firm—B. B. Olive

[57] ABSTRACT

A laser tube made of electrically insulating ceramic material, e.g., BeO, is formed of dry pressed and fired segments brazed together and with a chamfer or stepped area at the end of each segment adapted to interrupt the bore so as to prevent the establishment of a continuous electrically conducting layer in the tube bore.

1 Claim, 7 Drawing Figures

U.S. Patent  Apr. 12, 1983  4,380,077
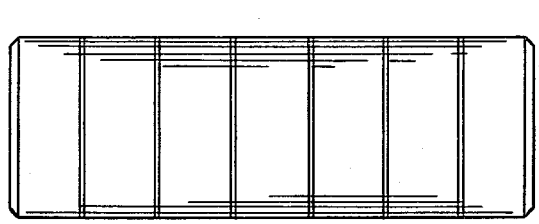
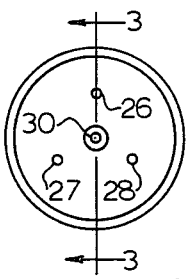
FIG. 2
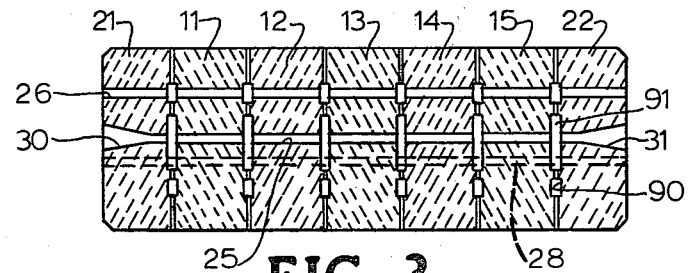
FIG. 3
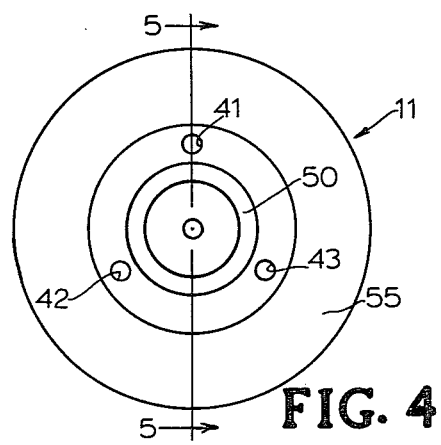
FIG. 4  FIG. 5
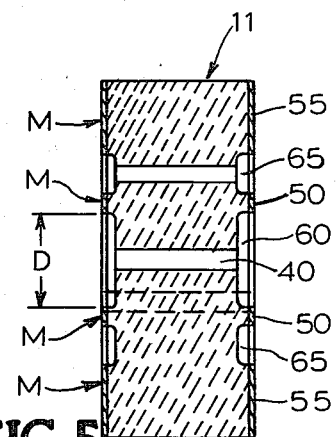
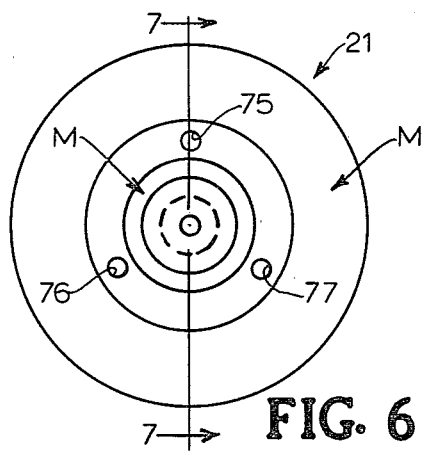
FIG. 6
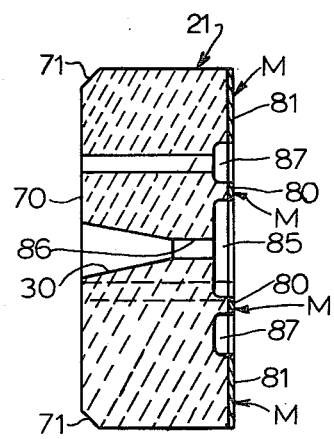
FIG. 7

SEGMENTED CERAMIC BORE LASER

DESCRIPTION

1. Technical Field

The invention relates to ceramic laser tube constructions and particularly to segment-type laser tube constructions.

2. Background Art

The construction of a laser tube formed of a ceramic material has been known. Also, a laser tube formed of segments has been known as illustrated by U.S. Pat. No. 3,460,053. However, a completely practical, segmented-ceramic laser tube has not been provided primarily because of a prominent deficiency dealt with by the present invention. This deficiency concerns failure of the laser brought about by an electrically conducting path being established in the bore region which prevents ignition after a period of normal operation.

In the operation of a gas laser device, ignition is provided by either a pulsed or d-c longitudinal electrical field in the bore region of the tube which ionizes the gas. If the bore region is shielded from the electric field by a conductive layer or sheath, ionization may be hindered or in fact prevented. For gas laser tubes in which the tube center is made of an insulating material such as BeO a nonconductive boundary exists around the bore. It has been found, however, that in tubes using a single piece ceramic center that the entire bore region may become conductively coated after long periods of operation. The resistivity of the conductive layer that is established is low enough as to prevent ignition. This constitutes a failure mechanism for the laser and shortens considerably its normally long life.

DISCLOSURE OF INVENTION

The ceramic laser tube assembly of the invention is made up of segments so that the bore is interrupted at each segment end by a chamfer or stepped area of larger diameter establishing a void surrounding the bore path between each segment. Regions of low plasma density are thus established between each segment and establishment of a continuous, electrically conducting coating along the length of the bore is prevented.

BRIEF DESCRIPTION OF THE DRAWINGS

FIG. 1 is a side view of a segmented ceramic laser tube according to the invention.

FIG. 2 is an end view of the laser tube shown in FIG. 1.

FIG. 3 is a section view taken along the line 3—3 of FIG. 2.

FIG. 4 is an end view, somewhat enlarged, of one of the center segments shown in FIG. 3.

FIG. 5 is a section view taken along line 5—5 of FIG. 4.

FIG. 6 is an end view, somewhat enlarged, of the inner end surface of one of the end segments shown in FIG. 1.

FIG. 7 is a section view taken along the line 7—7 of FIG. 6.

BEST MODE FOR CARRYING OUT THE INVENTION

The laser tube 10 of the invention is made up of a plurality of what will be referred to as center segments 11–15 and a pair of end segments 21, 22 all of which are formed of an insulating material, e.g., BeO. Center segments 11–15 when assembled with end segments 21, 22 form the laser tube 10 with the discharge bore 25 and the three illustrated gas bypass bores 26, 27, 28. Bore 25 has outwardly tapered end portions 30, 31.

The illustrated segmental construction is intended to achieve the main object of the invention, namely, to construct the laser bore such that a continuously conductive surface layer on the bore is prevented by interrupting the bore at intervals along its length. The specific manner in which this is achieved can be seen by more specific reference to the construction of the center segments 11–15 and end segments 21, 22.

FIGS. 4 and 5 illustrate the typical construction employed in the center segments with center segment 11 being used by way of example. With continuing reference to FIGS. 4 and 5, it will be noted that segment 11 includes a central aperture forming a portion of bore 25 and other apertures 41–43 forming portions of the gas bypass bores 26–28. It will also be noted that on each end of segment 11 there is provided an annular boss 50 surrounding a circular depression 60 concentric with bore 40. Another annular boss 55 spaced radially outwardly from boss 50 forms a channel 65 on each end of segment 11 and which communicates with the respective gas bypass bores 41–43.

Before discussing the manner in which the center and end segments are assembled, reference is made to FIGS. 6 and 7 for the construction employed with respect to the end segments 21, 22. Using end segment 21 as an example, it will be noted that end segment 21 has a flat outer face 70 with tapered outer edge 71 and the bore opening defined by the previously mentioned tapered bore end 30. Segment 21 also includes there bores 75–77 forming portions of the bypass gas bores 26–28.

With respect to the inner face of segment 21 illustrated in FIG. 7, it will be noted that there is provided an annular boss 80, comparable to boss 50 of FIG. 5 and which serves to establish the central circular depression 85 communicating with bore 86 forming part of the discharge bore 25. Annular boss 81 in conjunction with annular boss 80 will also be noted as forming an annular channel 87, comparable to annular channel 65 of FIG. 5 and which communicates with the respective bores 75–77 forming portions of the bypass gas bores 25–28.

For purposes of assembly, those surfaces indicated by the letter M are metalized on both the center segments 11–15 as well as the end segments 21, 22 and the segments are brazed together along the metalizing interfaces. In this manner, the gas bypass bores 26–28 are effectively sealed off from the main discharge bore 25. This is a significant feature of the invention since gas leakage between the segments is known to adversely affect laser performance. Also, of significant importance is the fact that the air gaps 91 formed in the main discharge bore 25 serve to interrupt the bore 25 at intervals along its length and thereby prevent the formation of a continuously conductive surface layer on bore 25. Air gaps 90 in the gas bypass bores 26–28 are also formed by channels 65 as indicated in FIGS. 3, 5 and 7.

As another aspect of the invention, center segments 11–15 and end segments 21, 22 are preferably fabricated by being dry pressed and fired since the desired segment shapes lend themselves to this mode of manufacture.

In effect, regions of low plasma density are provided between the respective pairs of bore segments and which is effective to prevent formation of the mentioned continuous coating along the bore. Even though each bore segment may itself become conductive, the electrical isolation between segments allows a voltage gradient or longitudinal E-field to exist in the bore region. Therefore, ignition will not be prevented even after many hours of operation and the life of the laser will be increased.

In one embodiment of the invention, the segments were brazed together as described and had relatively small longitudinal gaps 91 of 0.020±0.005 inches formed in the main discharge bore between segments. Such tolerance was readily accomplished using the mentioned dry press and firing technique for forming the segments and the laser performed as expected with acceptable efficiency.

I claim:

1. A cylindrical-shaped laser tube formed of a plurality of segments secured together and having a discharge bore and gas bypass bores formed through the segments, comprising:

(a) a plurality of ceramic cylindrical central segments with opposed end surfaces, each segment having a central aperture comprising a portion of the tube discharge bore and other apertures parallel to said central aperture and spaced radially outward therefrom and comprising portions of the tube gas bypass bores, each end surface having a first circular depression larger than, concentric with, and extending to and communicating with one end of said portion of said discharge bore and being defined by a surrounding first annular boss, a second annular depression radially spaced from said first circular depression and defined by said first annular boss and a second annular boss extending inwardly from the outer peripheral surface of said segment, one end of each said portion of said gas bypass bores extending to and terminating in said second annular depression with the width thereof being greater than the diameter of said gas bypass bores;

(b) a pair of end segments each having opposed outer and inner surfaces, a central aperture comprising a further portion of the tube discharge bore and other apertures parallel to said end segment central aperture and spaced radially outward therefrom and comprising further portions of the tube gas bypass bores, each said end segment outer surface being flat and surrounding a tapered end portion of said tube discharge bore and each said inner surface of each said end segment having the same formation as and mating that of each said central segment end surface; and (c) metalizing means integrally joining the respective said segment faces together in sealing relation with said central segments being mated and disposed between said end segments and with the respective said discharge bore and gas bypass bore portions in the segments aligned, said tube discharge bore being thereby sealed off from said bypass gas bores and interrupted by first air gaps disposed at intervals along its length established by said segment first circular depressions and being effective to prevent the establishment of a continuously electrically conductive surface layer along the length of the said laser discharge bore and said bypass gas bores being interrupted by second air gaps spaced radially outward from said first air gaps and disposed at intervals along their length established by said second annular depressions.

* * * * *

UNITED STATES PATENT AND TRADEMARK OFFICE
CERTIFICATE OF CORRECTION

PATENT NO. : 4,380,077
DATED : April 12, 1983
INVENTOR(S) : William H. McMahan

It is certified that error appears in the above—identified patent and that said Letters Patent is hereby corrected as shown below:

Column 2, line 33, "there" should be --three--.

Signed and Sealed this

Eighth Day of November 1983

[SEAL]

Attest:

GERALD J. MOSSINGHOFF

Attesting Officer

Commissioner of Patents and Trademarks